United States Patent [19]
Carter

[11] 3,828,993
[45] Aug. 13, 1974

[54] BICYCLE TRANSPORTING RACK

[76] Inventor: John S. Carter, 979 Debra Dr., Santa Barbara, Calif. 93110

[22] Filed: Jan. 20, 1972

[21] Appl. No.: 219,440

[52] U.S. Cl.............. 224/42.1 F, 211/22, 217/37, 280/278, 280/289
[51] Int. Cl............................................. B60m 9/10
[58] Field of Search...... 224/42.1 F, 42.1 E, 42.1 H, 224/42.1 G, 42.1 D, 42.1 R, 42.03 B; 280/292, 293, 402, 278, 289, 7.14, 14; 211/17, 22; 248/119 R; 206/46 M; 217/37, 38; 115/2, 21, 23; 272/73; D90/18

[56] References Cited
UNITED STATES PATENTS

| 588,376 | 8/1897 | Banker................................ 211/17 |
| 639,991 | 12/1899 | Jewell................................ 105/367 X |
| 1,496,782 | 6/1924 | Lightner et al. ................ 248/119 X |
| 2,339,947 | 1/1944 | Reaume............................ 217/37 X |
| 3,581,962 | 6/1971 | Osborn.......................... 224/42.1 E |
| 3,615,105 | 10/1971 | Harris................................ 280/292 |

FOREIGN PATENTS OR APPLICATIONS 1,425,202  0/1966  France............................ 224/42.1 F Primary Examiner—Robert J. Spar
Assistant Examiner—Jerold M. Forsberg
Attorney, Agent, or Firm—Edward R. Lowndes

[57] ABSTRACT

An automotive bicycle rack in the form of a car top adjunct and by means of which one or more bicycles may be fixedly supported in an upright condition above the car roof. A novel supporting bracket releasably holds the front wheel steering fork of each bicycle frame securely in position and application of such steering fork to the bracket, and removal therefrom is easily effected without requiring the use of tools.

2 Claims, 6 Drawing Figures

PATENTED AUG 13 1974 3,828,993
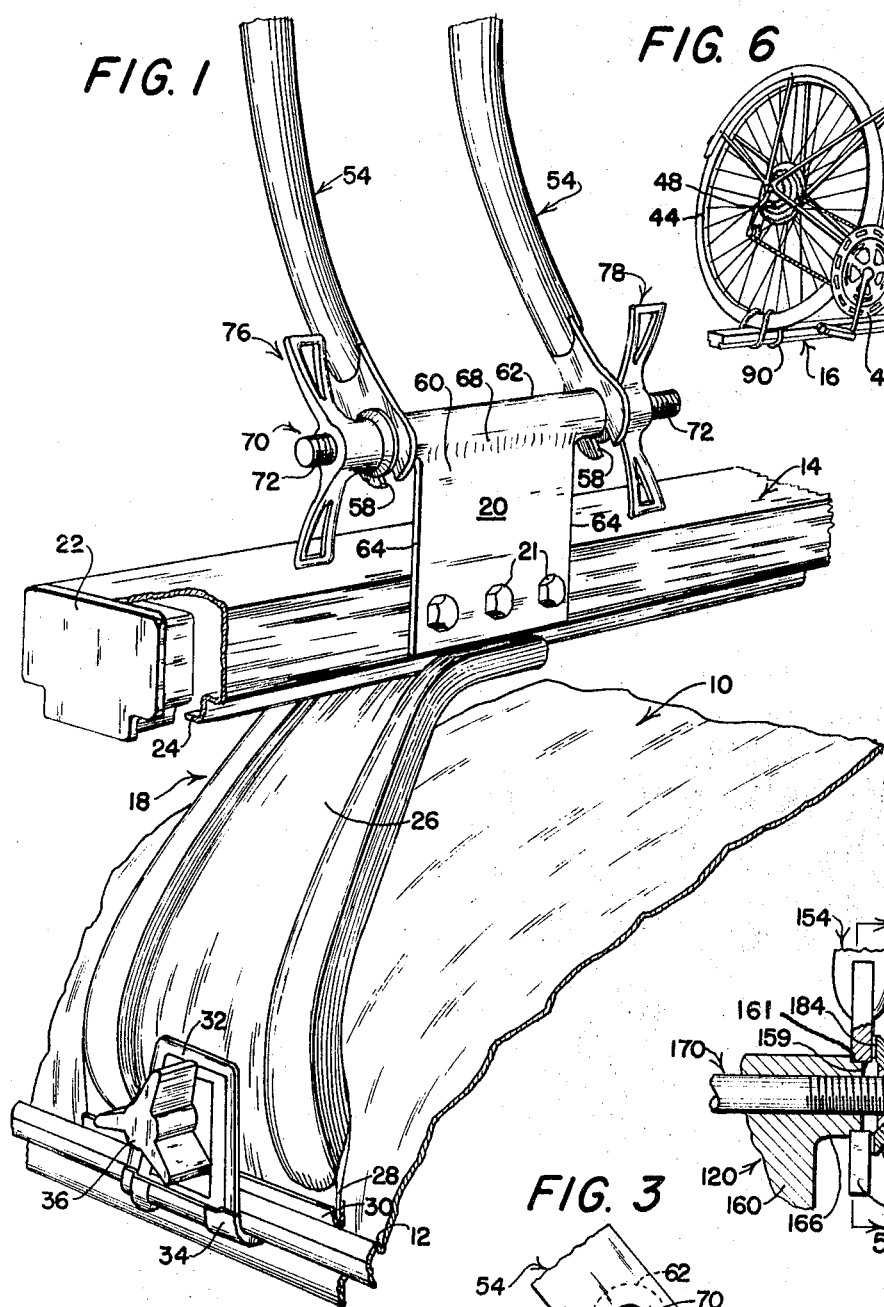
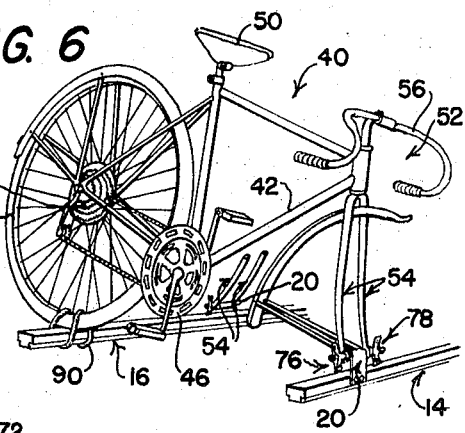
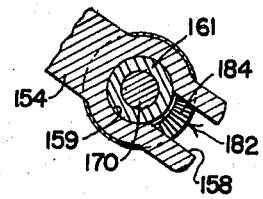
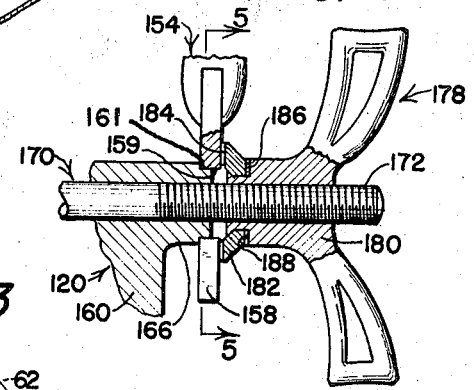
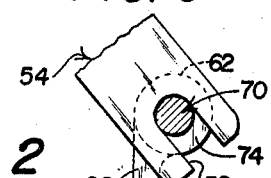
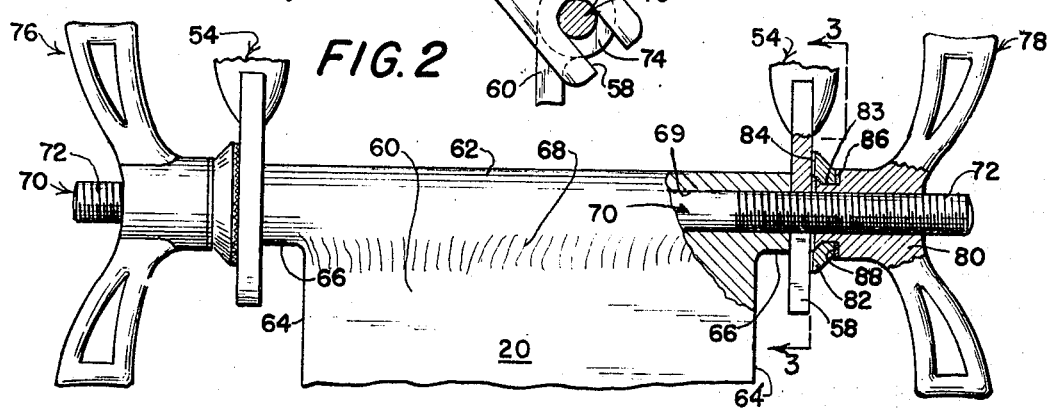

BICYCLE TRANSPORTING RACK

The improved automotive bicycle rack comprising the present invention has been designed primarily for use in connection with the car top transportation of one or more bicycles in an upright condition from one place to another with minimum ease of initial bicycle installation and of subsequent bicycle removal. The invention is, however, not limited to such use and bicycle racks embodying the principles of the present invention may, if desired, with or without modification as required, be employed for transportation of other wheeled vehicles such as tricycles, small powered so-called "minibikes," motorcycles and the like. Furthermore, the bicycle rack of the present invention is not necessarily limited to automotive use and, if desired, the same may be found useful in the freight transportation of bicycles, as for example in baggage cars or other railway vehicles, or in roadway vehicles. Irrespective however of the particular use to which the present invention may be put, the essential features thereof are at all times preserved.

Present day automotive bicycle racks which are roof top mounted vary widely in their construction but, in general, they are of two main types. In one type, the bicycle, or bicycles are supported in an inverted condition, i.e., with the handlebars and seats resting on the car roof or other supporting surface provided for them, and with the wheels projecting upwardly. In the other type, the bicycle or bicycles are supported in a prone condition, i.e., lying flat on their sides. Neither of these types of racks have proven altogether satisfactory.

In the former type of bicycle rack where the bicycles are inverted, a three-point suspension ordinarily is relied upon for stability, the bicycles being supported on the leather or other seat, as well as on the two handle bar ends, while various forms of clamping brackets, braces, tie down arrangements and the like afford further stability to the inverted bicycle. While such a rack may be found satisfactory for a given or standard bicycle, modern bicycle adjuncts such as battery or generator powered head lamps, braking levers, or high chair seats, render such racks incapable of accommodating bicycles which deviate appreciably from a standard. Fenders, guards and similar equipment which is furnished on many bicycles, and the varying shape characteristics of imported bicycles, often require that the initial installation of such a bicycle rack on an automobile shall be a custom job.

With bicycle racks which are designed to accommodate one or more bicycles in a prone or on-the-side position, the same limitations are present. The presence of laterally projecting bicycle pedals, multiple speed gearing arrangements, banana type seats and other customized accessories which are either original or added equipment on many bicycles frequently interfere with the intended placement of the bicycles on the roof top so that the various brackets and clamping devices which cooperate to make up the bicycle rack will fit only the particular type of bicycle for which the rack is originally designed. A bicycle which rests on its side is an extremely unstable piece of equipment and, if it is to be properly steadied and held against shifting, numerous specially designed clamping devices, struts, braces and the like are required. The larger the number of bicycles to be stored on the roof top, the more complicated are the bracing and hold-down structures. Many bicycle racks are provided with only minimum or basic hold-down devices and the use of flexible hold-down strapping and elastic tie cords are relied upon for safe bicycle transportation.

With all such present day bicycle racks, where multiple bicycle transporting is required, careful fitting of the various bicycles in place on a trial and error basis ordinarily must be resorted to with the bicycles ultimately being tied together for maximum stability and the prevention of bicycle shifting. Such bicycle installation and removal on the automotive roof top frequently requires skilled adult supervision.

The present invention is designed to overcome the above-noted limitations that are attendant upon the construction and use of conventional automotive bicycle roof top carriers and, toward this end, the invention contemplates the provision of a novel bicycle rack which is capable of supporting as many as five bicycles in an upright condition from the roof top of an automotive vehicle, the bicycles, when thus supported, being disposed in non-interfering relationship relative to one another, or relative to any moving parts of the automotive vehicle such as swinging doors or the like and, moreover, in such a manner as to offer no visual obstruction to the driver of the vehicle or any of the occupants thereof. Additionally, the bicycles when thus supported from the roof top, are individually mounted in fixed relationship so that no cross-bracing between bicycles is required.

It has long been the practice in connection with the manufacture of bicycles, regardless of their make or origin, to provide facilities whereby quick and easy front wheel removal and replacement from and to the front steering fork of the bicycle frame may be effected. Toward this end the distal or outer ends of the two fork tines invariably are slotted so that they may readily straddle the front wheel axle on opposite sides of the wheel and be clamped securely in position by means of a pair of nuts. Thus, by the simple expedient of loosening these nuts, the front wheel together with its assembled axle, may be lifted from the confines of the front fork, replacement of the wheel and axle being made by a reversal of the process. Many recently manufactured bicycles, both domestic and foreign, still further facilitate such front wheel removal by providing "quick-release fittings" for the front wheel, these consisting simply of relatively large and decorative wing nuts which are used in place of the earlier small hexagonal axle nuts. By such an arrangement high torque facilities are provided and there is no need for the use of wrenches or other tools when applying or dismounting the front wheel.

The present invention is predicated to a large extent upon this facility with which such front wheel removal may be effected and, accordingly, the invention contemplates the provision of a novel bicycle rack having associated therewith a plurality of fixed mounting bracket assemblies, each of which embodies a front bicycle axle simulation including an axle proper or spindle in the form of a bolt and a pair of quick-release wing nuts. The bracket assembly further includes a tubular axle sleeve or housing through which the spindle or bolt extends so that the opposite ends thereof project axially outwardly of the sleeve and constitute, in effect, a pair of supporting trunnions for the slotted ends of the bicycle steering fork. In applying a given bicycle to the bracket assembly, it is merely necessary to loosen the clamping nuts which are associated with the bicycle steering fork, remove the front wheel from the fork, and then cause the fork tines to straddle opposite ends of the bolt-receiving housing so that the slotted ends of the fork tines seat in saddle fashion over the two trunnions, after which the quick-release wing nuts may be tightened so as to clamp the outer ends of the fork tines securely in position against the bolt-receiving housing. The front wheel assembly which has thus been removed from the bicycle including the wheel axle, bearing cones, bearings and other adjuncts, such as the clamping nuts associated with the axle, remain intact so that such wheel assembly may be conveniently stored bodily as a unit in the trunk or other luggage compartment of the automotive vehicle.

Preferably, but not necessarily, the various bicycle frame supporting bracket assemblies are fixedly mounted on front and rear car top carrier frame bars which extend in parallelism transversely across the car roof and which may have gutter or other supporting means therefor. The distance between the two carrier frame bars is such that when the front steering fork of a given bicycle is operatively clamped by one of the supporting bracket assemblies, the rear wheel of such bicycle will conveniently rest by gravity upon the other carrier frame bar. In this manner, no portion of the bicycle will actually rest upon or come in contact with the car roof. By causing the various supporting bracket assemblies on the two carrier bars to be staggered in the transverse direction of the car roof, adjacent bicycles face in opposite direction in interlaced and nested fashion so that the lateral spread of the various handlebars will not cause interference while, by the same token, the laterally extending bicycle pedal structures will avoid each other.

The provision of an automotive bicycle rack such as has briefly been outlined above constitutes the principal object of the present invention. The provision of such a rack which is extremely simple in its construction and which therefor may be manufactured at a low cost; one which is possessed of a minimum number of individual parts, particularly moving parts, and which therefore is unlikely to get out of order; one which is rugged and durable and which therefore will withstand rough usage; one which is capable of ease of assembly and disassembly for purposes of inspection of parts, replacement or repair; one which requires no particular degree of skill for its initial installation on a vehicle or for its subsequent use; one which will not damage or deface the vehicle to which it is applied; one which is readily removable from the vehicle when not in use; one which may be compacted in a relatively small space either for shipping or for storage purposes; one which is attractive in its appearance and pleasing in its design; and one which, otherwise is well adapted to perform the services required of it, are further desirable features which have been borne in mind in the production and development of the present invention.

Other objects and advantages of the invention, not at this time enumerated, will readily suggest themselves as the nature of the invention is better understood.

In the accompanying single sheet of drawings forming a part of this specification, two illustrative embodiments of the invention have been shown.

In these drawings:

FIG. 1 is a fragmentary perspective view of a portion of an automobile roof top, showing one of two similar carrier bars which are employed in connection with the present invention operatively installed thereon, the carrier bar having mounted thereon one of a plurality of bicycle frame-supporting bracket assemblies embodying the present invention;

FIG. 2 is an enlarged fragmentary side elevational view, partly in section, of the frame-supporting bracket assembly shown in FIG. 1;

FIG. 3 is a sectional view taken on the line 3—3 of FIG. 2;

FIG. 4 is a fragmentary sectional view, similar to the sectioned portion of FIG. 2, showing a slightly modified form of frame-supporting bracket assembly capable of use in connection with the present invention;

FIG. 5 is a sectional view taken on the line 5—5 of FIG. 4; and

FIG. 6 is a perspective view, largely schematic in its representation, illustrating the manner in which the two carrier bars of the present invention, together with their associated frame-supporting bracket assemblies, may be employed for the support of multiple bicycles.

Referring now to the drawings in detail, and in particular to FIG. 1, a fragmentary portion of an automobile roof top is designated in its entirety at 10 and is provided with the usual roof gutters on opposite sides thereof, only one such gutter 12 being disclosed herein. Suitably supported from the two gutters 12 is a more or less conventional car top carrier arrangement including front and rear carrier rails 14 and 16 respectively (see also FIG. 6), together with suitable supporting brackets 18 therefor, only the front rail 14 being disclosed in FIG. 1.

The particular carrier rails 14 and their associated supporting brackets 18 selected for exemplary illustration herein are, as previously stated, generally of conventional construction and no claim is made herein to any novelty associated with the same, the novelty of the present invention residing rather in the application to the front and rear carrier rails 14 and 16 of a plurality of bicycle fork-supporting spindle-carrying brackets 20, one of which is shown in FIG. 1 and the nature and function of which will be set forth in detail presently. It will be understood that various forms of carrier rails 14, 16 and supporting brackets 18 therefor are capable of use in connection with the present bicycle rack, the particular carrier rail arrangement illustrated herein being merely one which has been found suitable for use as a mounting means for the various spindle-supporting brackets 20. Briefly, each carrier rail is in the form of a longitudinally split tubular member, the opposite ends of which are closed by means of removable plastic end caps 22 and the inturned lower edges 24 of which seat in channels 26 which are provided in the rail-supporting brackets 18. These brackets 18 are in the form of sheet metal stampings and the lower edges 28 of these stampings seat in rubber or other elastomeric channel strips 30 which, in turn, seat within the gutters 12. The lower edges of the brackets 18 are secured in position within the gutters 12 by means of suitable hook devices 32 having hook portions 34 which underlie the gutters 12 and which are secured in position by means of suitable nut and bolt assemblies 36.

Considering now the nature of the spindle-supporting bracket 20 and the manner in which it serves as a clamping means for the support of a single bicycle in position on the car roof 10, it will be understood that this bracket receives thereon the front steering fork of the bicycle after the front bicycle wheel has been removed therefrom, the manner in which such application of the steering fork to the bracket 20 being clearly shown in FIGS. 1 and 6. The bicycle which is shown in FIG. 6 may be of any conventional type, the particular bicycle 40 illustrated therein being of the multi-speed type and including the usual main frame 42, rear wheel and tire assembly 44, pedal and sprocket assembly 46 chain and change-speed gearing 48, seat 50 and steering framework 52, the latter including the usual front steering fork 54 and handlebars 56. It will be understood that the front wheel assembly of the bicycle 40 is removed for the purpose of attachment of the steering fork 54 to the bracket 20, the removal being effected bodily as a unit and including not only the wheel and its tire, but also the usual wheel axle and the two clamping nuts which invariably are associated therewith, such removal being a comparatively simple expedient after the two nuts have been loosened, it being necessary only to lift the wheel axle from its seated position within the open-ended slots 58 (FIG. 3) which are provided in the extreme outer ends of the fork tines. The thus removed wheel assembly, with all of its constituent parts remaining in their assembled relationship, may then be stored conveniently in the trunk compartment of the vehicle and the front steering fork 54 of the bicycle then operatively installed on the supporting bracket 20 in the manner that will now be fully described in detail.

Referring again to FIG. 1, and additionally to FIGS. 2 and 3, the supporting bracket 20 involves in its general organization a generally rectangular flat plate 60 which is secured by bolts 21 to one side face of the front carrier rail 14 and along the upper edge of which there extends a tubular sleeve 62, the opposite ends of which slightly overhang the side edges 64 of the plate as indicated at 66. Various ways are contemplated for constructing the bracket 20 and in the illustrated form of bracket the tubular sleeve 62 and plate 60 are separately formed with the tube being welded as indicated at 68 in FIG. 2 along the upper edge of the plate. It is within the purview of the invention however to fashion the tube and plate in one piece by a stamping operation, the tube 62 being in the form of a rolled upper edge on the plate 20.

Projecting loosely through the horizontal bore 69 which is established by the sleeve 62 is an elongated axle-like bolt or spindle 70, the opposite ends of which project outwardly of the sleeve with each end region of the bolt being threaded as indicated at 72. The bolt 70, in a general way, simulates a conventional bicycle axle and the projecting threaded end regions 72 are designed for reception thereover of the slots 58 which are provided in the tines of the bicycle front wheel fork 54, the threaded portions 72 thus, in effect, establishing trunnions for supporting the fork tines 54.

Preferably, the effective length of the sleeve 62 is slightly greater than the normal distance between the outer ends of the fork tines so that when the slots 58 are caused to seat in saddle-like fashion on the threaded end regions 72 of the bolt, the inside faces of the fork tines in the vicinity of the slots 58 will yieldingly bear against the circular end faces 74 (FIG. 3) of the overhanging ends 66 of the sleeve 62. In order to securely clamp the slotted end regions of the fork tines hard against these circular end faces 74, a pair of wing nut assemblies 76 and 78 are threadedly received over the thread end regions 72 of the bolt 70 and are drawn tight.

The two wing nut assemblies 76 and 78 are of special construction, both assemblies being substantially identical and each consisting of a relatively large wing nut body 80, the forward end of which carries a captured washer 82 which is freely rotatable in an annular recess 83 formed on the body 80 and which is provided with a knurled clamping face 84. A bearing ring 86 is interposed between the washer 82 and an annular shoulder 88 on the wing nut body 80.

From the above description, and with reference to FIG. 6, it will be observed that when the front wheel fork 54 of the bicycle 40 is operatively installed upon the bracket assembly 20 in the manner set forth above, the steering fork will be maintained in a nearly vertical position, while the rear wheel and tire assembly 44 will rest by gravity upon the rear carrier rail 16 with the bicycle assuming a generally upright position and with the bicycle frame lying in a vertical plane which extends longitudinally of the car roof 10. The bicycle, in this supported condition is essentially stable and will not change its position. However, in order to guard against bicycle dislodgment under conditions of sudden impact or extreme side sway, the rear wheel assembly may, if desired, be tied down to the rear carrier rail 16 by means of a short length of commercially available elastic shock cord such as has been disclosed in FIG. 6 and designated at 90.

In order to facilitate application of the front steering fork 54 to the bolt 70, one of the two wing nut assemblies is fairly tight on the bolt 70, while the other wing nut assembly is allowed to spin freely on the bolt. Preferably the wing nut assembly 76 which is on the outer side of the carrier bar 14 is maintained loose for ease of installation of the bicycle in the rack. The maintenance of one reasonably tight wing nut assembly also assists in maintaining the bolt 70 centered within the sleeve 62.

In FIGS. 4 and 5, a slightly modified form of the invention has been shown. In certain makes of bicycles, particularly certain bicycles of foreign manufacturers, a safeguard is provided against loss of the bicycle front wheel in the event that either or both clamping nuts become loosened on the front axle. With this type of bicycle, the spacing between adjacent steering fork tines is slightly less than the overall extent of the bicycle wheel hub so that, in order to insert the hub between the two fork tines, it is necessary to spread the tines apart before the slotted ends thereof can be caused to seat on the ends of the front wheel axle. As shown in FIGS. 4 and 5, the slots 158 which are provided at the ends of the fork tines 154 are formed with enlarged circular bores 159 in the base regions thereof and, normally, these bores 159 engage over cylindrical hub-like protuberances which are formed on the front wheel hub structure, usually on the bearing cones. Thus, in the event that either or both of the wing nuts (only the nut 178 being shown) should become loosened during bicycle operation, the inward spring pressure of the two fork tines 154 will maintain the axle and hub arrangement securely between the two fork tines and the front wheel cannot be dislodged from between the fork tines until such time as these tines are spread apart a sufficient distance to afford clearance from the hub structure. In FIGS. 4 and 5, a slightly modified form of spindle-carrying bracket 120 is shown and is capable of accommodating fork tines such as the tines 154 which are provided with slots 158 having widened base regions as described above. In view of the similarity between the fork tines 158 and the previously described fork tines 58, and in order to avoid needless repetition of description, similar reference numerals but of a higher order have been applied to the corresponding parts as between the disclosures of FIGS. 2 and 3 on the one hand and FIGS. 4 and 5 on the other.

In the modified form of supporting bracket 120, the cylindrical overhanging portions 166 of the tubular sleeve 160 are provided with reduced tubular end regions 161 which fit into the circular bores 159 so that when the wing nuts are tight, the captured washers 182 bear against the outer sides of the fork tines 154 in the vicinity of the slots 158 and force them against the annular shoulders which are occasioned by the reduced end regions 161. Thus, in the event that the wing nuts become loosened, the inward flexion of the two fork tines will hold the steering framework 52 (FIG. 6) of the bicycle 40 in position on the supporting bracket 120 against dislodgment. Otherwise, the supporting bracket 120 remains substantially the same as the previously described supporting bracket 20.

In order to enable the herein described bicycle rack to accommodate the mounting and transporting of a plurality of bicycles, a plurality of the supporting brackets 20 may be mounted on both of the carrier rails 14 and 16 in transversely staggered relationship as shown in FIG. 6. By such an arrangement, adjacent bicycles will face in opposite directions so that a fairly close spacing of bicycles may be resorted to without interference between bicycle handlebars 56, pedal arrangements 46 or other laterally protruding bicycle components. With an average size car roof 10, it has been found that by mounting three of the supporting brackets 20 on the front carrier rail 14, and two such brackets 20 on the rear carrier rail, five bicycles may readily be accommodated without crowding.

The invention is not to be limited to the exact arrangement of parts shown in the accompanying drawings or described in this specification as various changes in the details of construction may be resorted to without departing from the spirit of the invention. For example, although the invention has been illustrated and described herein in connection with bicycle forks 54 having slotted fork tines, the bracket 20 is capable of accommodating an occasional special type of bicycle in which the fork tines, instead of being provided with slots such as the slots 158, are provided with circular axle-receiving holes therein. Additionally, although only two carrier rails 14 and 16 have been disclosed herein, under certain circumstances, as for example in connection with a station wagon type of automotive vehicle, where space conditions will permit, three such carrier rails may be mounted on the car roof 10 in longitudinal spaced parallelism and the various supporting brackets 20 appropriately arranged on such carrier rails for the accommodation of a larger number of bicycles. Under certain circumstances it may be found desirable to utilize a plurality of the fork-supporting, spindle-carrying brackets 20 in a suitable rack arrangement whereby a plurality of bicycles may conveniently be stored for transportation in a railway baggage or freight car, in a roadway truck or the like, or in an aircraft. In such an instance, a single carrier rail, positioned on the floor of the vehicle and appropriately equipped with a number of the brackets 20 could be used to hold the bicycles in an upright position in side-by-side relationship. By staggering the brackets in two spaced apart rows, interference between the handlebars and other laterally projecting bicycle components would be avoided. The rear wheels of the various bicycles in such a case would be allowed to rest directly on the vehicle floor and would not necessarily require any tie-down arrangements. Therefore, only insofar as the invention has particularly been pointed out in the accompanying claims is the same to be limited.

Having thus described my invention, what I claim and desire to secure by Letters Patent is:

1. A bicycle supporting rack for supporting a bicycle in a substantially upright position over a generally horizontal automobile roof top having longitudinally extending and outwardly projecting side gutters, said bicycle having a front steering fork including a pair of substantially parallel fork tines provided with open-ended slots at their distal ends, said rack comprising a carrier rail adapted for positioning over said roof top, means for positioning said rail transversely over said roof top, said means comprising a pair of rail-supporting brackets having lower edges adapted to rest in said gutters, and hook devices adapted to underlie the gutters for releasably clamping the lower edge regions of the brackets in position over said gutters, the upper end regions of said rail-supporting brackets presenting horizontal portions having channels within which the end regions of the rail are received and supported, a spindle-supporting bracket fixedly secured to said carrier rail and projecting upwardly therefrom, said latter bracket comprising a flat plate provided with a horizontal upper edge and vertical side edges, a tubular sleeve extending horizontally along said upper edge and having its end portions overhanging said side edges and presenting oppositely facing annular end faces, an elongated axle-like bolt projecting loosely through said sleeve and having its opposite end regions projecting outwardly beyond said end faces, said projecting end regions of the bolt establishing, in effect, a pair of coaxial trunnions designed for saddle-like reception of the slotted ends of the fork tines with said tines straddling the opposite sides of the bracket, and a pair of tine-clamping wing nut assemblies threadedly received on said trunnions and adapted, when tightened, to engage the outer sides of said fork tines in the vicinity of said slots and force said tines into frictional engagement with said oppositely facing annular end faces on said tubular sleeve.

2. A bicycle supporting rack as set forth in claim 1, wherein said upper edge of the flat plate is rolled to provide said tubular sleeve.

* * * * *